(12) United States Patent
Kubota et al.

(10) Patent No.: US 10,935,116 B2
(45) Date of Patent: Mar. 2, 2021

(54) SEAL MEMBER FOR BALL SCREW DEVICE (71) Applicant: THK CO., LTD., Tokyo (JP)

(72) Inventors: Yuji Kubota, Tokyo (JP); Futoshi Nakamura, Tokyo (JP); Tetsuhiro Nishide, Tokyo (JP); Kotaro Kawai, Tokyo (JP); Bin Zhao, Tokyo (JP); Tomoyuki Sugiyama, Tokyo (JP)

(73) Assignee: THK CO., LTD., Tokyo (JP)

( * ) Notice: Subject to any disclaimer, the term of this patent is extended or adjusted under 35 U.S.C. 154(b) by 97 days.

(21) Appl. No.: 16/468,445

(22) PCT Filed: Jan. 5, 2018

(86) PCT No.: PCT/JP2018/000067
§ 371 (c)(1),
(2) Date: Jun. 11, 2019

(87) PCT Pub. No.: WO2018/131535
PCT Pub. Date: Jul. 19, 2018

(65) Prior Publication Data
US 2020/0408290 A1    Dec. 31, 2020

(30) Foreign Application Priority Data

Jan. 12, 2017  (JP) .............................. JP2017-003100

(51) Int. Cl.
*F16J 15/3268* (2016.01)
*F16H 25/24* (2006.01)
(Continued)

(52) U.S. Cl.
CPC ...... *F16H 25/2418* (2013.01); *F16J 15/3268* (2013.01); *F16H 25/2204* (2013.01); *F16H 57/0497* (2013.01)

(58) Field of Classification Search
CPC .. F16J 15/3268; F16J 15/3272; F16J 15/3276; F16H 25/2418; F16H 25/00;
(Continued)

(56) References Cited

U.S. PATENT DOCUMENTS 6,178,839 B1 *  1/2001  Yoshida .............. F16H 25/2418
                                                        74/424.87
7,430,933 B2 * 10/2008  Yatsushiro .......... F16H 25/2418
                                                        74/89.4
(Continued)

FOREIGN PATENT DOCUMENTS

JP           5-43310 Y2    11/1993
JP        2000-230619 A     8/2000
(Continued)

OTHER PUBLICATIONS

International Search Report dated Mar. 27, 2018, issued in counterpart application No. PCT/JP2018/000067 (1 page).
(Continued)

*Primary Examiner* — Nathan Cumar
(74) *Attorney, Agent, or Firm* — Westerman, Hattori, Daniels & Adrian, LLP (57) ABSTRACT

A seal member for a ball screw device, which is fixed to an axial end surface of a nut member of the ball screw device and is configured to seal a gap between the nut member and the screw shaft, the seal member including: a plurality of base plates which each have a through hole having an inner diameter larger than an outer diameter of the screw shaft; a spacer plate, which is sandwiched between two base plates adjacent to each other, and has a seal accommodation hole having an inner diameter larger than an inner diameter of a through hole of the base plates; and a seal plate, which has a shaft-fitting hole corresponding to a sectional shape of the screw shaft in a direction perpendicular to an axial direction, and is arranged in the seal accommodation hole of the spacer plates.

2 Claims, 6 Drawing Sheets

(51) Int. Cl.
*F16H 57/04* (2010.01)
*F16H 25/22* (2006.01)

(58) Field of Classification Search
CPC ...... F16H 25/22; F16H 25/24; F16H 25/2204; F16H 57/0497
USPC ........................................................ 277/572
See application file for complete search history.

(56) References Cited

U.S. PATENT DOCUMENTS

| | | | |
|---|---|---|---|
| 7,500,409 B2* | 3/2009 | Yatsushiro | F16H 25/2418 |
| | | | 277/354 |
| 9,506,544 B2* | 11/2016 | Iida | F16J 15/3224 |
| 2002/0036384 A1* | 3/2002 | Nakagawa | F16H 25/2418 |
| | | | 277/628 |

FOREIGN PATENT DOCUMENTS

| | | |
|---|---|---|
| JP | 2007-263281 A | 10/2007 |
| JP | 2010-169114 A | 8/2010 |
| JP | 2014-43879 A | 3/2014 |

OTHER PUBLICATIONS

Decision to Grant a Patent dated Sep. 4, 2018, issued in counterpart Japanese Patent Application No. 2017-253090, w/English translation (6 pages).

Notification of Reason for Refusal dated Jun. 5, 2018, issued in counterpart Japanese Patent Application No. 2017-253090, w/English translation (4 pages).

* cited by examiner

SEAL MEMBER FOR BALL SCREW DEVICE

TECHNICAL FIELD

The present invention relates to a seal member, which is to be fixed to a nut member of a ball screw device and is configured to seal a gap defined between the nut member and a screw shaft with which the nut member is threadedly engaged.

BACKGROUND ART

A ball screw device is a mechanical element capable of mutually converting a rotary motion and a linear motion, and is often used for the purpose of converting a rotary motion generated by a servo motor into a linear motion in, for example, various working machines, conveyance devices, and industrial robots. The ball screw device includes a large number of balls, a screw shaft having a spiral rolling groove on an outer surface thereof to allow the balls to roll, and a nut member threadedly engaged with a circumference of the screw shaft through intermediation of the balls so as to be relatively movable in a spiral manner relative to the screw shaft.

As described above, the ball screw device is to be used for various purposes. For example, in the use at a linear guide portion of a working machine, there is a case in which, for example, cutting powder of a work piece or a coolant liquid falls on the screw shaft. When the nut member moves under a state in which such foreign objects adhere to the screw shaft, the balls rolling in the rolling groove may bite those foreign objects, which may cause degradation in movement accuracy of the nut member relative to the rotation of the screw shaft in an early stage. Moreover, a lubricant such as grease is sealed in the nut member for lubrication of the balls and the rolling groove, and it is required to prevent leakage of the lubricant to the outside of the nut member. Therefore, in actual use of the ball screw device, in general, seal members are mounted at both ends of the nut member in an axial direction to seal a gap defined between the nut member and the screw shaft with the seal members.

Hitherto, there has been known a seal member for a ball screw device disclosed in Patent Literature 1. Specifically, the known seal member is formed of a plurality of seal plates, which are formed of synthetic rubber or synthetic resin, and a ring-shaped case, which is configured to accommodate the plurality of seal plates in a stacked state and is fixed to the nut member. The seal plates each have, at a center thereof, a through hole for allowing the screw shaft to pass therethrough, and the through hole is formed so as to match with a sectional shape of the screw shaft in a direction perpendicular to an axial direction. When the screw shaft passes through the through hole, an inner peripheral edge of the through hole serves as a seal lip portion to be brought into close contact with an outer peripheral surface of the screw shaft, to thereby wipe out dust or a coolant liquid from the surface of the screw shaft.

The through hole of the seal plate has a shape of a deformed circle matching with a sectional shape of the screw shaft. Therefore, in order to allow the inner peripheral edge of the through hole to be evenly brought into contact with the circumference of the screw shaft, the seal plate is accommodated in the case without being fixed. That is, the case regulates movement of the seal plate only in the axial direction.

CITATION LIST

Patent Literature

[PTL 1] JP 05-43310 Y2

DISCLOSURE OF THE INVENTION

Problems to be Solved by the Invention

As described above, the ball screw device is to be used for various purposes and in various use environments. Therefore, performance required for the seal member varies depending on the use environment. For example, with regard to a ball screw device to be used for a woodworking machine, in order to prevent entry of fine wood chips into the nut member, it is required that the seal plate be brought into surface contact with the screw shaft in a wide range in the axial direction, and that the seal plate be pressed toward the screw shaft to increase a surface contact pressure between the seal plate and the screw shaft. Meanwhile, in an environment in which almost no powder dust adheres to the screw shaft, it is only required that the seal plate prevent leakage of the lubricant sealed in the nut member. Moreover, in order to suppress generation of friction heat, it is only required that the seal plate be brought into line contact at its distal end with respect to the screw shaft with an extremely small force.

As described above, when a function required for the seal member is considered, there arises a need for changing a material and a plate thickness of the seal plate in accordance with a use environment of the ball screw device. However, when an attempt is made with the related-art seal member described above to adapt to seal plates having various materials and plate thicknesses, there arises a need to prepare a case for accommodating the seal plate in accordance with materials and thicknesses of the seal plates. As a result, there has been a problem of increase in manufacturing cost and management cost for components.

Means for Solving the Problems

The present invention has been made in view of such problem, and has an object to provide a seal member for a ball screw, which is capable of flexibly adapting to changes in material and thickness of a seal plate and reducing manufacturing cost and management cost for components with a simple configuration.

That is, according to one embodiment of the present invention, there is provided a seal member for a ball screw device, which is fixed to an axial end surface of a nut member of the ball screw device and is configured to seal a gap between the nut member and the screw shaft, the seal member including: a plurality of base plates each having a through hole having an inner diameter larger than an outer diameter of the screw shaft; a spacer plate, which is sandwiched between two base plates adjacent to each other, and has a seal accommodation hole having an inner diameter larger than an inner diameter of a through hole of the base plates; and a seal plate, which has a shaft-fitting hole corresponding to a sectional shape of the screw shaft in a direction perpendicular to an axial direction, and is arranged in the seal accommodation hole of the spacer plates.

Effects of the Invention

According to the present invention, through changes in thickness and the number of the spacer plates, the seal member can adapt to various plate thicknesses of the seal plate. Moreover, the seal plate can be mounted to the nut member in an optimum fixing method in accordance with a material of the seal plate. Therefore, the seal member can flexibly adapt to changes in material and plate thickness of the seal plate in accordance with the use environment of the ball screw device. Further, the base plates and the spacer plates can be standardized without changes. Accordingly, reduction in manufacturing cost and management cost for components can be achieved.

MODE FOR CARRYING OUT THE INVENTION

Now, with reference to the accompanying drawings, detailed description is made of a seal member for a ball screw device according to the present invention.

Figure 1:
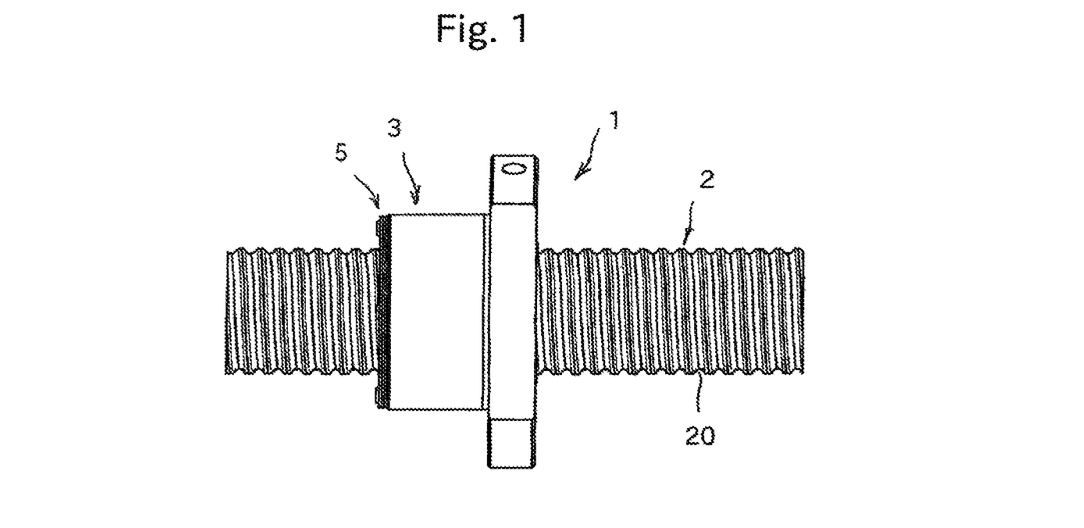
FIG. 1 is a front view for illustrating one example of a ball screw device to which a seal member according to the present invention is applicable.

FIG. 1 is an illustration of one example of the ball screw device to which the seal member according to the present invention is mounted.

This ball screw device 1 includes a screw shaft 2 and a cylindrical nut member 3. The screw shaft 2 has, on its outer peripheral surface, a rolling groove 20 for balls formed in a spiral shape with a predetermined lead. The nut member 3 is threadedly engaged with a circumference of the screw shaft 2 through intermediation of a plurality of balls. For example, through rotation of the screw shaft 2 relative to the nut member 3, the nut member 3 moves in an axial direction of the screw shaft 2. Alternatively, through rotation of the nut member 3 relative to the screw shaft 2, the screw shaft 2 moves in an axial direction of the nut member 3. The screw shaft 2 may be so-called multiple thread screw having a plurality of rolling grooves 20.

Moreover, a seal member 5 configured to seal a gap defined between the nut member 3 and the screw shaft 2 is mounted to an end surface of the nut member 3 in the axial direction. In FIG. 1, the seal member 5 is depicted only on one end surface of the nut member 3. However, the seal member 5 is usually mounted also to another end surface of the nut member 3.

Figure 2:
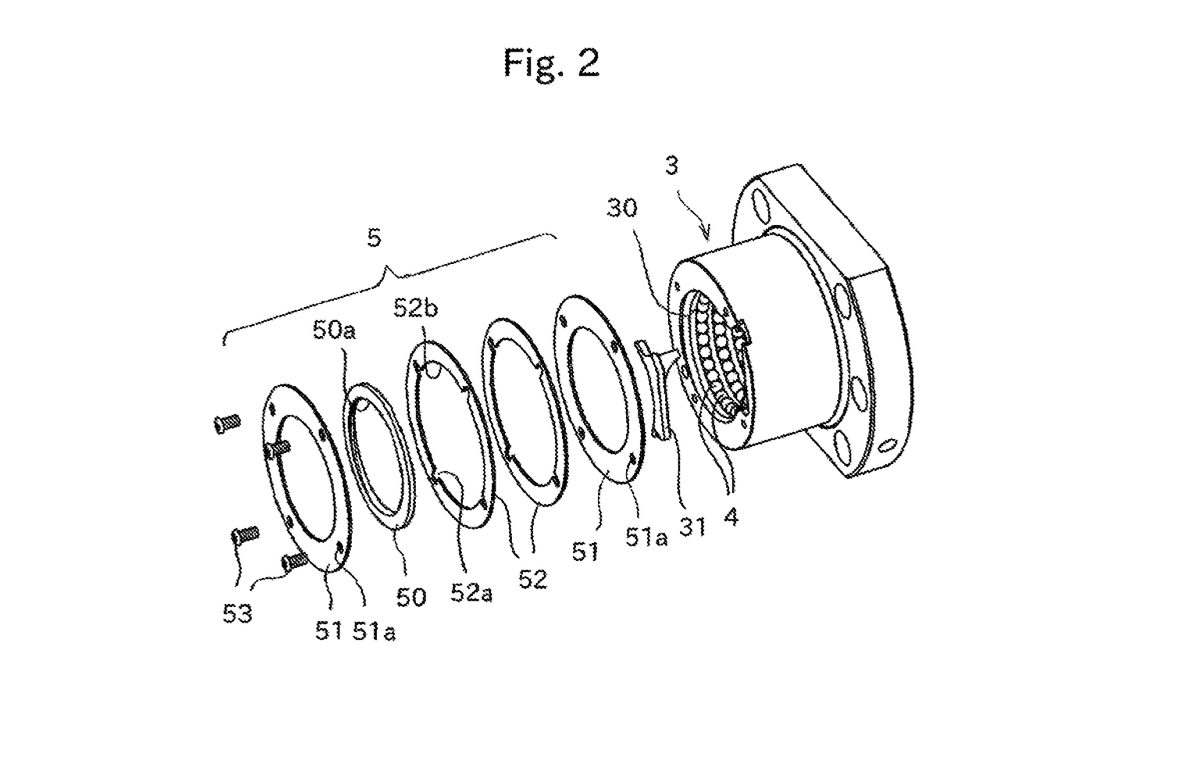
FIG. 2 is an exploded perspective view for illustrating a seal member according to a first embodiment of the present invention.

FIG. 2 is an illustration of a seal member according to a first embodiment of the present invention, and is an exploded perspective view for illustrating a state in which the seal member 5 is removed from the nut member 3. The nut member 3 is formed into a cylindrical shape with a through hole for allowing the screw shaft 2 to be inserted therethrough, and a spiral load track 30 opposed to the rolling groove 20 formed in the screw shaft 2 is provided on an inner peripheral surface of the through hole. Balls 4 are arrayed on the load track 30, and roll on the load track 30 while bearing a load between the nut member 3 and the screw shaft 2.

The nut member 3 has an endless circulation path for the balls 4. In the nut member 3 illustrated in FIG. 2, a return path for the balls 4 is provided along the axial direction of the nut member 3, and a circulation support member 31 is mounted to an axial end surface of the nut member 3. The circulation support member 31 guides the balls 4 between the load track 30 and the return path, and constructs an endless circulation path for the balls with several turns of the spiral load track set as one circuit. As a method for constructing the endless circulation path for the balls in the nut member, there may be adopted any suitable structure such as so-called deflector type with one turn of the load track set as one circuit or so-called return pipe type in which a pipe member connecting several turns of the load track is mounted to the nut member.

The seal member 5 includes a seal plate 50, two base plates 51, and spacer plates 52. The seal plate 50 is held in slide contact with the screw shaft 2. The two base plates 51 are located on both sides of the seal plate 50. The spacer plates 52 are sandwiched between the two base plates 51.

The base plate 51 is formed into a ring shape which has a through hole having an inner diameter slightly larger than an outer diameter of the screw shaft 2. A plurality of mounting holes 51a which allow fixing screws 53 being connection members to pass therethrough are formed at equal intervals in a circumferential direction. The fixing screws 53 pass through the base plates 51 to be fastened to the nut member 3.

The spacer plate 52 is formed into a ring shape which has a seal accommodation hole 52b having an inner diameter larger than an inner diameter of the through hole of the base plate 51, and cutout portions 52a configured to allow the fixing screws 53 to pass therethrough are formed at equal intervals in the circumferential direction. When the two base plates 51 are to be fastened to the nut member 3, the spacer plates 52 are sandwiched between the base plates 51 to be integrated with the base plates. Moreover, when the fixing screws 53 are to be fastened, through fitting of the cutout portions 52a to the fixing screws 53, the spacer plates 52 are correctly positioned between the two base plates 51. In FIG. 2, two spacer plates 52 are arranged between two base plates 51. However, the number of spacer plates 52 to be sandwiched between the two base plates 51 and the plate thickness of each spacer plate 52 can be suitably determined in accordance with a material or a plate thickness of the seal plate 50.

The seal plate 50 is formed into a ring shape which has a shaft-fitting hole 50a corresponding to a sectional shape perpendicular to the axial direction of the screw shaft 2. Therefore, when the screw shaft 2 is inserted through the shaft-fitting hole 50a, an inner peripheral edge of the seal plate 50, that is, an inner peripheral surface of the shaft-fitting hole 50a is fitted to a periphery of the screw shaft 2. An outer diameter of the seal plate 50 is set larger than an inner diameter of the through hole of the base plate 51 and smaller than an inner diameter of the seal accommodation hole 52b of the spacer plate 52. The outer diameter of the seal plate 50 is smaller than the inner diameter of the seal accommodation hole 52b of the spacer plate 52. Thus, the fixing screws 53 passing through the base plates 51 and the spacer plates 52 are located on a radially outer side with respect to the seal plate 50, and the fixing screws 53 do not pass through the seal plate 50.

Thus, when the spacer plates 52 and the seal plate 50 are sandwiched between the two base plates 51, and the fixing screws 53 are fastened to the nut member 3, the seal plate 50 is located inside the seal accommodation holes 52b of the spacer plates 52, and movement of the seal plate 50 in the axial direction of the screw shaft 2 is restricted by the base plates 51. Accordingly, the seal plate 50 is irremovably held inside the seal accommodation holes 52b. On this occasion, a space corresponding to the thickness of the spacer plates 52 is defined between the two base plates 51. The seal plate 50 is accommodated in this space, and is held between the two base plates 51.

A material of the seal plate 50 may suitably be selected in accordance with a use environment of the ball screw device 1 to which the seal member 5 is mounted. For example, there may be used a material formed of a synthetic resin film or a material formed of a fiber sheet having rubber or synthetic resin impregnated therein.

Figure 3:
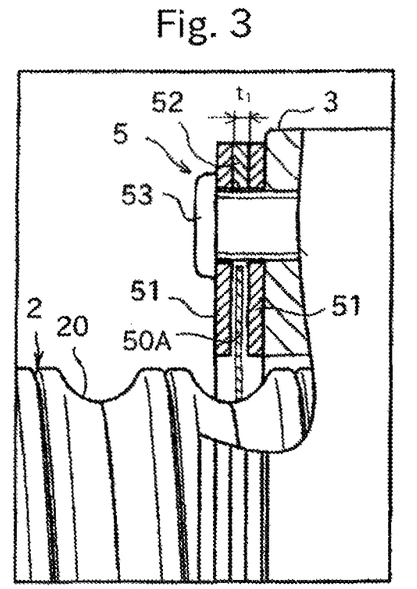
FIG. 3 is a main-part enlarged sectional view for illustrating the seal member when a thin film seal is used as the seal plate.

FIG. 3 is a sectional view for illustrating one example of a state in which the seal plate 50 is mounted to the seal member 5.

In the example illustrated in FIG. 3, a thin film seal 50A formed of a synthetic resin film is used as the seal plate 50, and one spacer plate 52 is sandwiched between the two base plates 51. The thin film seal 50A is used mainly for the purpose of preventing leakage of the lubricant from the inside of the nut member 3 to the outside, but also serves to remove a foreign object adhering to the screw shaft 2. The inner peripheral surface of the shaft-fitting hole 50a in the thin film seal 50A is opposed to the outer peripheral surface of the screw shaft 2 through a minute gap which is slightly larger than an oil film thickness. When the thin film seal 50A is excessively brought into slide contact with the screw shaft 2, the thin film seal 50A is bent, and hence there is a risk of causing an increase in gap between the inner peripheral surface of the shaft-fitting hole 50a and the screw shaft 2. Moreover, there is also a risk of causing expansion of the screw shaft 2 due to generation of a friction heat. Therefore, when the thin film seal 50A is to be mounted to the nut member, it is important to prevent the thin film seal 50A from being excessively pressed against the screw shaft 2 and prevent the thin film seal from being bent.

Thus, when such thin film seal 50A is to be used, a gap $t_1$ defined between the two base plates 51 by the spacer plates 52 is set larger than an axial thickness of the thin film seal 50A. With this, the thin film seal 50A is held between the two base plates 51 through a slight gap without being sandwiched, and is freely displaceable in a radial direction of the screw shaft 2. As a result, the thin film seal 50A is always held at an optimum position with respect to the screw shaft 2, and hence the inner peripheral edge of the thin film seal 50A, that is, the inner peripheral surface of the shaft-fitting hole 50a can be prevented from being excessively pressed against the screw shaft 2. Moreover, the two base plates 51 are provided on both sides of the thin film seal 50A through a minute gap. Therefore, even when the inner peripheral edge of the thin film seal 50A is in contact with the screw shaft, bending of the thin film seal 50A can be prevented. With this, the function of the thin film seal 50A described above can be maximally exerted.

For clear illustration of the presence of the gap defined between the thin film seal 50A and the base plates 51, the gap is illustrated with emphasis in FIG. 3. However, an actual size of the gap is smaller than a plate thickness of the thin film seal 50A.

Figure 4:
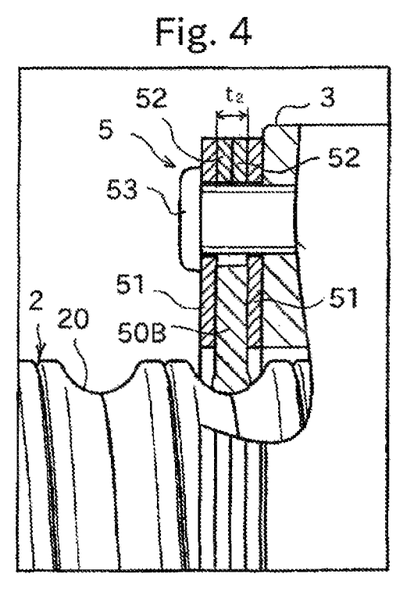
FIG. 4 is a main-part enlarged sectional view for illustrating the seal member when a surface-contact seal is used as the seal plate.

FIG. 4 is a sectional view for illustrating another example of a state in which the seal plate 50 is mounted to the seal member 5.

In the example illustrated in FIG. 4, a surface-contact seal 50B is used as the seal plate 50. The surface-contact seal 50B is evenly held in contact with the screw shaft 2 at low contact pressure similarly to the thin film seal 50A, but secures the performance of removing foreign objects with a contact area set larger than that of the thin film seal 50A. Therefore, an axial thickness of the surface-contact seal 50B is larger than that of the thin film seal 50A, and two spacer plates 52 are sandwiched between the two base plates 51.

The surface-contact seal 50B can be produced with an elastic member such as rubber or elastomer by die forming with the screw shaft 2 as a core. For example, the surface-contact seal 50B is obtained in the following manner as disclosed in Japanese Patent Application Laid-open No. 2014-156888. Specifically, woven fabric having, for example, rubber or elastomer impregnated therein is wound around an outer peripheral surface of the screw shaft 2 as a core. After that, a skeleton layer made of synthetic resin is formed by die forming around the woven fabric while an appropriate pressure being applied, thereby being capable of forming a seal base member having a through hole matching with a shape of the outer peripheral surface of the screw shaft 2. Then, after the screw shaft 2 as a core is taken out from the seal base member, the seal base member is cut into a donut shape with a suitable thickness. Accordingly, the surface-contact seal 50B is obtained. In the surface-contact seal 50B produced in such a manner, the shape of the outer peripheral surface of the screw shaft 2 is transferred to the inner peripheral surface of the shaft-fitting hole 50a. Thus, a spiral projection matching with the rolling groove 20 of the screw shaft is formed in the inner peripheral surface of the shaft-fitting hole. When the surface-contact seal 50B is fitted to the screw shaft 2, the surface-contact seal 50B and the screw shaft 2 are evenly brought into contact with each other without a gap at low surface pressure.

In order to secure the even contact between the surface-contact seal 50B and the screw shaft 2, when the surface-contact seal 50B is to be fixed between the two base plates 51, the surface-contact seal 50B is first fitted to the screw shaft 2. After the surface-contact seal 50B is positioned by the screw shaft 2, the fixing screws 53 are fastened so that the surface-contact seal 50B is sandwiched between the two base plates 51.

Moreover, the surface-contact seal 50B formed of the elastic member such as rubber or elastomer, when being slightly squeezed in its thickness direction (axial direction), is capable of improving close contact between the inner peripheral surface of the shaft-fitting hole 50a and the screw shaft. Specifically, a gap $t_2$ defined between the two base plates 51 by the spacer plates is set slightly smaller than an axial thickness of the surface-contact surface seal 50B so that the surface-contact seal 50B is fixed in a state of being squeezed between the two base plates 51 adjacent to each other. An inner peripheral surface of the shaft-fitting hole 50a of the squeezed surface-contact seal 50B slightly expands toward the radially outer surface of the screw shaft 2. As a result, the inner peripheral surface of the shaft-fitting hole 50a can reliably be brought into close contact with respect to the circumference of the screw shaft 2. FIG. 4 is an illustration of such case, from which the state in which the inner peripheral edge of the surface-contact seal 50B is pressed against the screw shaft 2 to be slightly expanded.

Next, an appropriate axial thickness of the surface-contact seal 50B is to be discussed.

As described above, with regard to the surface-contact seal 50B, a wide contact area is set while the surface-contact seal 50B is held in contact with respect to the screw shaft 2 at low contact surface pressure, thereby securing the performance of removing foreign objects adhering to the screw shaft 2. Therefore, in the view point of enhancing the performance of removing the foreign objects, when the axial thickness of the surface-contact seal 50B is set larger, the contact area with respect to the screw shaft 2 increases, and the foreign object removing performance of the surface-contact seal 50B is enhanced.

However, the surface-contact seal 50B produced with a material such as rubber or elastomer by die forming is liable to cause contraction after forming. When the axial thickness of the surface-contact seal 50B is large, the spiral projection formed on the inner peripheral surface of the shaft-fitting hole 50a of in the surface-contact seal 50B causes excessive interference with the rolling groove 20 of the screw shaft 2, which may cause formation of a gap between the inner peripheral surface of the shaft-fitting hole 50a and the screw shaft 2. When the contact pressure between the inner peripheral surface of the shaft-fitting hole 50a and the screw shaft 2 becomes stronger, generation of a friction heat may cause expansion of the screw shaft 2 or a rise in rotational torque required for rotational drive of the screw shaft. Moreover, when the gap is formed between the inner peripheral surface of the shaft-fitting hole 50a and the screw shaft 2, the sealability therebetween is impaired, and hence foreign objects may be more liable to enter the nut member 3 from the outside.

Figure 5:
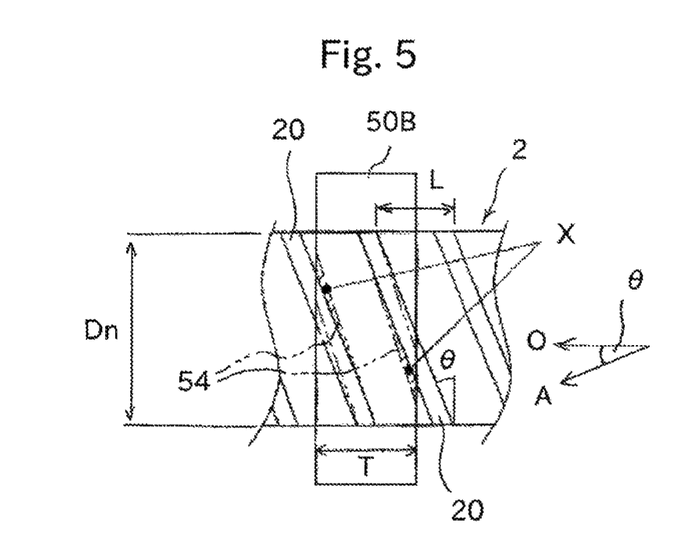
FIG. 5 is an explanatory view for illustrating a contact state between the surface-contact seal and a screw shaft.
Figure 6:
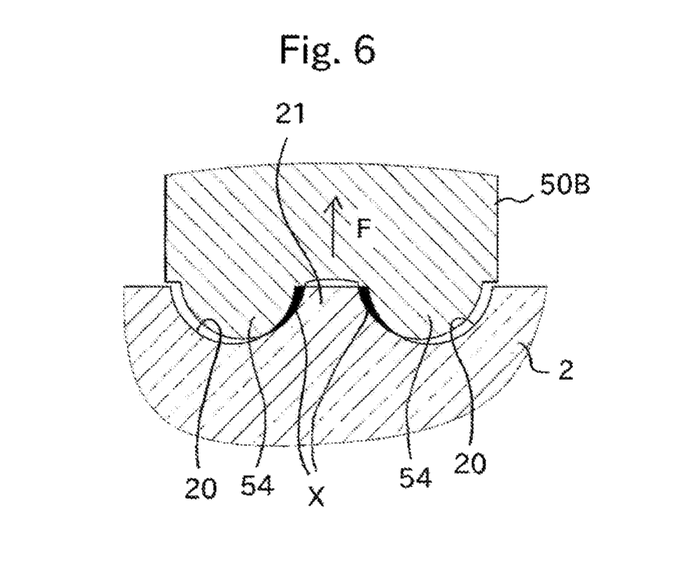
FIG. 6 is a sectional view for illustrating a contact state between a projection of the surface-contact seal and a rolling groove of the screw shaft.

FIG. 5 and FIG. 6 are explanatory views for illustrating the interference between the projection of the surface-contact seal 50B and the rolling groove 20 of the screw shaft 2. In FIG. 5, the outer peripheral surface of the screw shaft 2 is developed, and the surface-contact seal 50B overlaps thereon. The rolling groove 20 for the balls 4 is formed with a predetermined lead in the screw shaft 2, and the rolling groove 20 is inclined at a lead angle θ with respect to a plane orthogonal to the axial direction of the screw shaft 2. The lead corresponds to a length by which the rolling groove proceeds in the axial direction of the screw shaft when turning around the screw shaft by one turn. When the lead is represented by L, and a circumferential length of the screw shaft 2 is represented by Dn, the lead angle θ can be expressed by $\theta = \tan^{-1}(L/Dn)$.

On inner peripheral surface of the surface-contact seal 50B formed by die forming using the screw shaft 2 as a core, there is formed the spiral projection 54 matching with the rolling groove 20. The projection 54 originally is formed so as to have the same lead and lead angle with the rolling groove 20. However, when the surface-contact seal 50B contracts after completion of forming, as indicated by two-dot chain lines in FIG. 5, the lead angle of the projection 54 is liable to become smaller than the lead angle θ of the rolling groove 20. Therefore, when the surface-contact seal 50B is mounted to the nut member 3 and fitted to the screw shaft 2, as illustrated in FIG. 5, there are formed regions X in which the projection 54 and the rolling groove 20 having different lead angles interfere with each other.

FIG. 6 is a sectional view for illustrating the screw shaft 2 and the surface-contact seal 50B taken along an A direction (see FIG. 5) inclined by the lead angle θ with respect to the axial direction O of the screw shaft 2, and is an illustration of a contact state between the screw shaft 2 and the surface-contact seal 50B. As illustrated in FIG. 6, when the interference regions X described above are generated in a plane extending along the A direction so as to be located on both sides of the thread ridge 21 of the screw shaft 2, a force F acts on the surface-contact seal 50B in a direction of pushing up the surface-contact seal 50B from the outer peripheral surface of the screw shaft 2. As a result, as illustrated in FIG. 6, the surface-contact seal 50B floats upward from the outer peripheral surface of the screw shaft 2, and hence a gap is liable to be formed between the projection 54 of the surface-contact seal 50B and the rolling groove 20 of the screw shaft 2.

Figure 7:
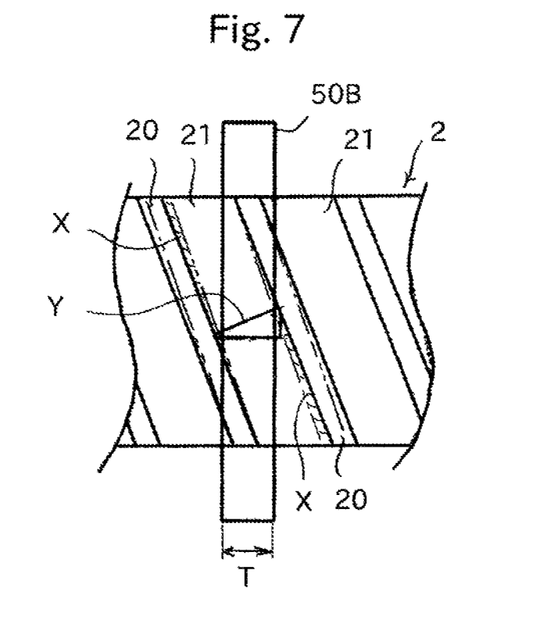
FIG. 7 is an explanatory view for illustrating an upper limit value of an axial thickness of the surface-contact seal.

In order to prevent such floating of the surface-contact seal 50B and enhance the close contact between the surface-contact seal 50B and the screw shaft 2, it is effective to set the axial thickness T of the surface-contact seal 50B to a predetermined value or less to prevent generation of the interference regions X on both sides of the thread ridge 21 of the screw shaft 2. FIG. 7 is a view corresponding to FIG. 5 described above, and is an illustration of a case in which the axial thickness T of the surface-contact seal 50B is smaller than that given in FIG. 5. As illustrated in FIG. 7, when the axial thickness T of the surface-contact seal 50B falls within a width of the thread ridge 21 of the screw shaft 2 indicated by a line segment Y, in the A direction inclined by the lead angle θ with respect to the axial direction O, the interference regions X are not generated on both sides of the thread ridge 21 of the screw shaft 2 at any position in the circumferential direction of the surface-contact seal 50B. Accordingly, generation of the force F of pushing up the surface-contact seal 50B from the outer peripheral surface of the screw shaft 2 can be suppressed. Here, the line segment Y in FIG. 7 is a line segment extending along the A direction and across the thread ridge 21 in a shortest distance.

That is, in a case in which the screw shaft 2 and the surface-contact seal 50B are matched with each other in respective axial directions and fitted to each other, when the axial thickness T of the surface-contact seal 50B falls within the range of the line segment Y extending across the thread ridge 21 in a shortest distance, a gap is less liable to be formed between the projection 54 of the surface-contact seal 50B and the rolling groove 20 of the screw shaft 2, thereby being capable of enhancing the close contact between the surface-contact seal 50B and the screw shaft 2.

Figure 8:
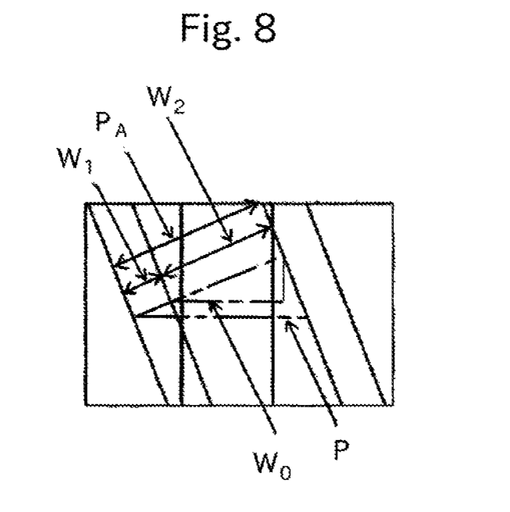
FIG. 8 is an explanatory view for illustrating a calculation formula for deriving the upper limit value of the axial thickness of the surface-contact seal.
Figure 9:
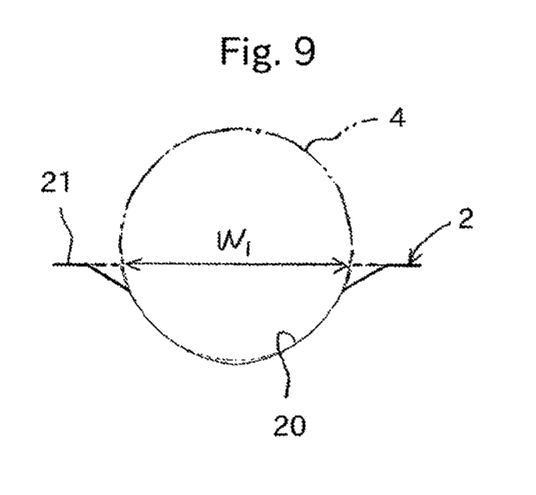
FIG. 9 is an explanatory view for illustrating a groove width of the rolling groove formed in the screw shaft.

FIG. 8 is an explanatory view for illustrating a relationship between a length of the line segment Y and the axial thickness T of the surface-contact seal 50B. A line segment P indicated by a one-dot chain line in FIG. 8 represents an axial pitch of the rolling groove 20 in the outer peripheral surface of the screw shaft. When one rolling groove is formed in the screw shaft, the pitch P is the same as the lead L. When two rolling grooves are formed in the screw shaft, the pitch P corresponds to L/2. Thus, a pitch $P_A$ of the rolling groove in the A direction is expressed by $P \cos \theta$. Thus, when the groove width of the rolling groove 20 is represented by $W_1$, a width $W_2$ of the thread ridge in the A direction is expressed by $P \cos \theta - W_1$. The width $W_2$ corresponds to the length of the line segment Y illustrated in FIG. 7. The groove width $W_1$ of the rolling groove 20 is, as illustrated in FIG. 9, an intersection between the outer peripheral surface of the screw shaft 2 and a spherical surface of the balls 4 rolling on the rolling groove 20, and is different from a width of the rolling groove 20 formed in the screw shaft 2.

When a length obtained by projecting the width $W_2$ of the thread ridge in the A direction in the axial direction O of the screw shaft is represented by $W_0$, $W_0 = P \cos^2 \theta - W_1 \cos \theta$ is given. When the axial thickness T of the surface-contact seal 50B is equal to or less than the width $W_0$, as described above, the interference regions X are not generated on both sides of the thread ridge 21 of the screw shaft 2 at any position in the circumferential direction of the surface-contact seal 50B. Accordingly, the close contact between the surface-contact seal 50B and the outer peripheral surface of the screw shaft 2 can be enhanced. That is, when the axial thickness T of the surface-contact seal 50B is set so that the following conditions are given, the surface-contact seal 50B is evenly brought into contact with the outer peripheral surface of the screw shaft, and hence the sealing performance can reliably be given.

$$T \leq P \cos^2 \theta - W_1 \cos \theta$$

T: axial thickness of surface-contact seal 50B
P: pitch of rolling groove 20 in outer peripheral surface of screw shaft 2
θ: lead angle of rolling groove 20
$W_1$: groove width of rolling groove 20

As described above, through changes in plate thickness or the number of the spacer plates, the seal member 5 to which the present invention is applied is adaptable to the plate thicknesses of various seal plates 50, and the seal plate 50 can be mounted to the nut member 3 in an optimum fixing method in accordance with a material of the seal plate 50. Thus, according to the seal member 5 of the present invention, the sealing member 5 can flexibly adapt to changes in material and plate thickness of the seal plate 50 in accordance with a use environment of the ball screw device 1. Moreover, even when the material or the plate thickness of the seal plate 50 is changed, standardization can be achieved without changes of the base plates 51 and the spacer plates 52, thereby being capable of reducing production cost or management cost for components.

Figure 10:
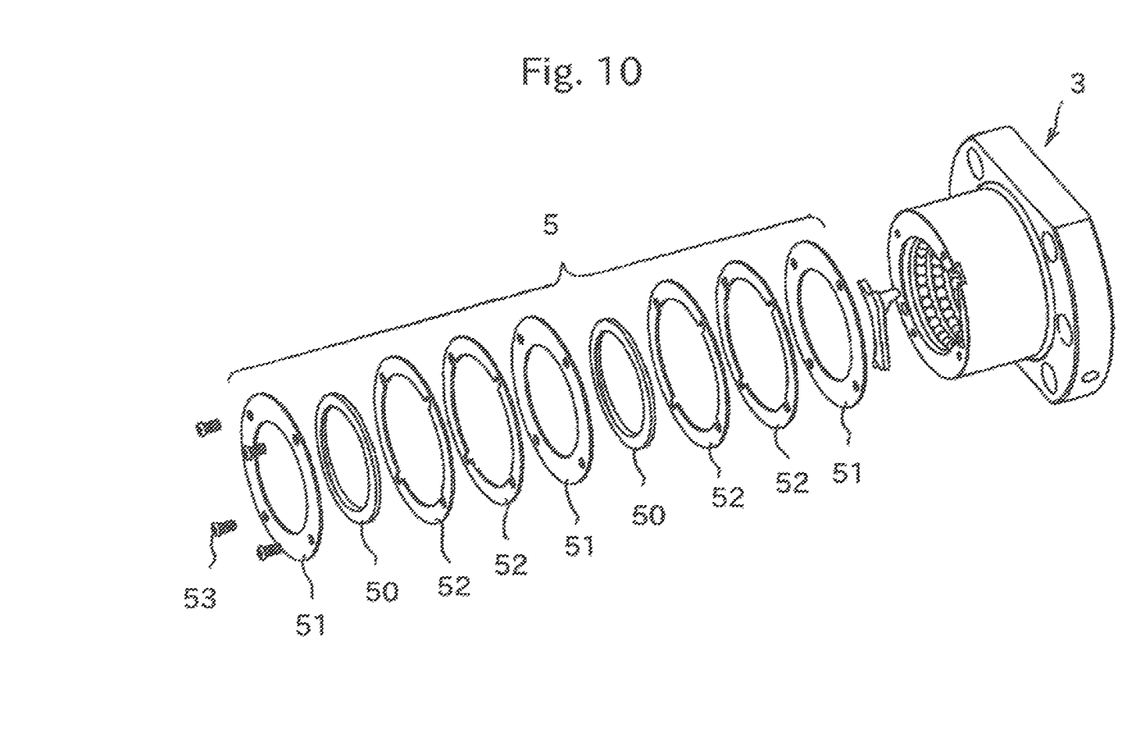
FIG. 10 is an exploded perspective view for illustrating a seal member according to a second embodiment of the present invention.

FIG. 10 is an exploded perspective view for illustrating a seal member according to a second embodiment of the present invention. In the first embodiment described with reference to FIG. 2, one seal plate 50 is arranged between two base plates 51. However, in the second embodiment, three base plates 51 and two seal plates 50 are stacked alternately to form a so-called double-seal seal member.

The spacer plates 52 are each sandwiched between base plates 51 adjacent to each other similarly to the first embodiment described above, and the spacer plates 52 define an accommodation space for the seal plate 50. In FIG. 10, two spacer plates 52 are arranged between two base plates 51 adjacent to each other. However, the number of the spacer plates 52 can be suitably increased or decreased in accordance with a plate thickness of the seal plate 50.

The seal member according to the present invention, as illustrated in the second embodiment, can suitably be changed not only in material or plate thickness of the seal plate 50 but also in the number of the seal plate 50, thereby being capable of suitably achieving a performance in accordance with a use environment of the ball screw device 1.

In the embodiment described above, the fixing screws 53 being connection members passing through the base plates 51 and the spacer plates 52 are used to fasten the base plates 51 and the spacer plates 52 to the nut member 3. However, for example, rivets may be used as the connection members to integrate the base plates 51 and the spacer plates 52 with each other in advance to form the seal member 5, and the integrated seal member 5 may be mounted to the nut member by other means such as a stopper ring.

The invention claimed is:

1. A seal member for a ball screw device, which is fixed to an axial end surface of a nut member of the ball screw device, and is configured to seal a gap between the nut member and a screw shaft, the seal member comprising:
    a plurality of base plates each having a through hole having an inner diameter larger than an outer diameter of the screw shaft;
    a spacer plate, which is sandwiched between two of the plurality of base plates adjacent to each other, and has a seal accommodation hole having an inner diameter larger than an inner diameter of a through hole of the plurality of base plates; and
    a seal plate, which has a shaft-fitting hole corresponding to a sectional shape of the screw shaft in a direction perpendicular to an axial direction, and is arranged in the seal accommodation hole of the spacer plates,
    wherein a space defined between the two of the plurality of base plates adjacent to each other is set larger than an axial thickness of the seal plate.

2. The seal member for a ball screw device according to claim 1, further comprising a connection member configured to pass through the plurality of base plates and the spacer plate, to thereby fix the plurality of base plates and the spacer plate to an axial end surface of the nut member,
    wherein the seal plate is arranged between the two of the plurality of base plates adjacent to each other and in a seal accommodation hole of the spacer plate.

* * * * *